United States Patent
Risley

[15] 3,643,782
[45] Feb. 22, 1972

[54] CONVEYOR SYSTEM HAVING APPARATUS FOR DIVIDING CONVEYED ARTICLES INTO ROWS

[72] Inventor: Robert F. Risley, Wauwatosa, Wis.

[73] Assignee: Jos. Schlitz Brewing Company, Milwaukee, Wis.

[22] Filed: Oct. 20, 1970

[21] Appl. No.: 82,264

[52] U.S. Cl. ................................................198/30
[51] Int. Cl. ..........................................B65g 47/26
[58] Field of Search ..............198/30, 33 R, 33 A, 33 AB

[56] References Cited

UNITED STATES PATENTS

| | | | |
|---|---|---|---|
| 2,752,027 | 6/1956 | Gentry | 198/31 |
| 2,775,334 | 12/1956 | Jeremiah | 198/30 |
| 3,330,402 | 7/1967 | Schlueter | 198/30 |

*Primary Examiner*—Richard E. Aegerter
*Attorney*—Andrus, Sceales, Starke & Sawall

[57] ABSTRACT

A conveying system for containers including a mechanism for dividing the containers into separate rows and for eliminating tipped containers from the rows. The mechanism includes a central dividing wall disposed longitudinally of the conveyor and a pair of sidewalls, each of which defines a passage with the central wall. The upstream portions of the passages diverge outwardly toward the sides of the conveyor and while the downstream portions of the passages converge inwardly toward the longitudinal center of the conveyor. The central dividing wall is inclined upwardly and a tipped, crosswise-oriented container moving along the conveyor will engage and ride up the inclined central wall to automatically tilt the container to an upright position. The portions of the sidewalls which border the discharge or converging portions of the passages are provided with openings and if a tipped, longitudinally oriented container moves through the diverging upstream portion of the passage, it will be directed through the opening to the exterior of the conveyor. The mechanism separates an accumulation of containers into two distinct rows, as well as righting transversely oriented, tipped containers and removing longitudinally oriented tipped containers.

11 Claims, 4 Drawing Figures

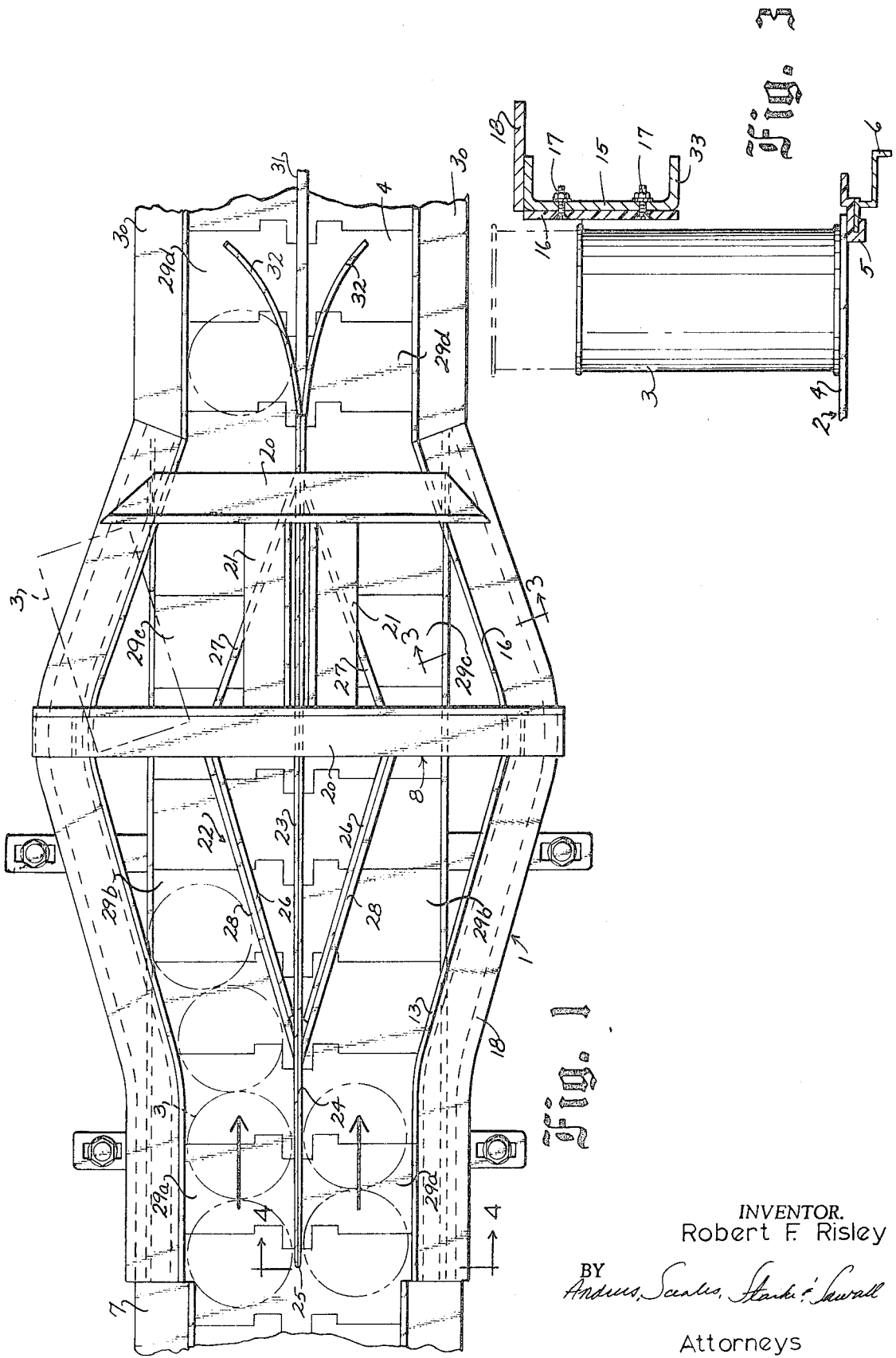

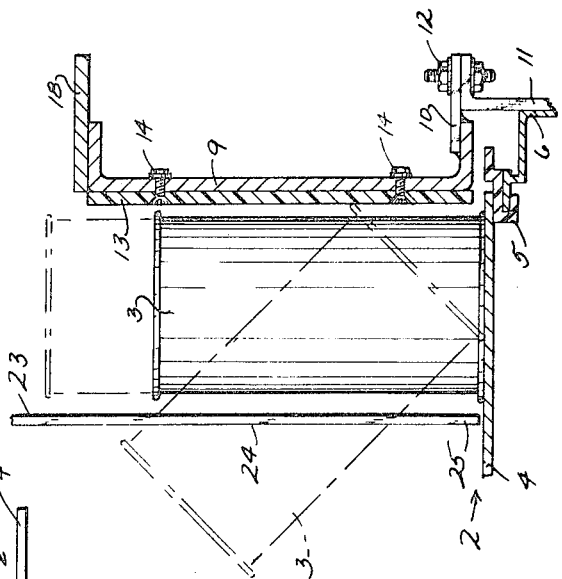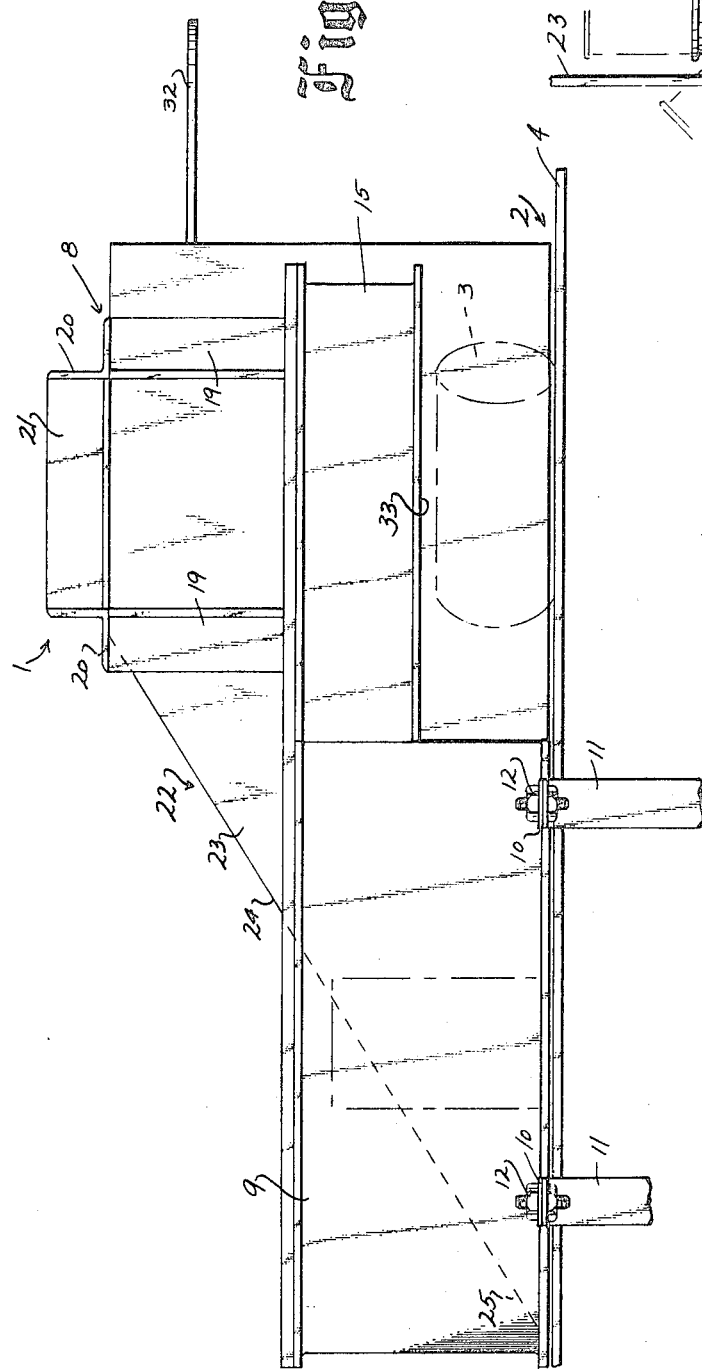

CONVEYOR SYSTEM HAVING APPARATUS FOR DIVIDING CONVEYED ARTICLES INTO ROWS

This invention relates to a conveying system and more particularly to a mechanism associated with a conveying system for separating an accumulation of containers into two distinct rows as well as eliminating tipped containers from the rows.

In a conveying system, as used in a brewery or a soft drink plant, the cans or other containers are automatically conveyed at extremely high speeds by a conveyor system to the filler, the pasteurizer and the packer. The cans are normally conveyed to the packer in two separate parallel rows, and it is essential that the cans being conveyed to the packer are in the upright condition. Occasionally cans moving on the conveying system will tip due to extreme vibration or impact and the tipped cans must be removed from the line before reaching the packer. It is a common practice in a high-speed conveying line to utilize a "down-can" photoeye which will spot down cans in the line and automatically stop the conveyor. With the conveyor line stopped, the downed can is removed or righted manually and the line is then restarted. This procedure results in down time for the conveyor, as well as requiring manual surveilance.

The present invention is directed to a device to be associated with a high-speed conveying system which acts to divide an accumulation of cans or containers into two separate rows, as well as righting transverse-oriented, downed or tipped cans and removing longitudinally oriented downed cans from the line. The device includes a central divider wall which is positioned longitudinally of the conveyor, and a pair of sidewalls are spaced outwardly from the central divider wall. Each of the sidewalls defines a passage with the central wall and the inlet or upstream portions of the passages diverge outwardly toward the sides of the conveyor while the rear or downstream portions of the passages converge toward the longitudinal center of the conveyor. An accumulation of cans moving along the conveyor is divided into two rows by the divider wall and each row of cans travels within one of the passage defined by the central divider wall and the respective sidewall.

The central divider wall is provided with an inclined edge and if a transverse-oriented downed can moves along the conveyor, it will engage and ride up the inclined edge. This action automatically serves to tilt or right the can to an upright position.

To remove longitudinally oriented downed cans, the sections of the sidewalls which border the conveying downstream portions of the passages are provided with openings located in alignment with the diverging upstream portions of the passages. As a longitudinally oriented tipped can moves through the diverging upstream portion of the passage, it will automatically be conveyed straight through the openings in the sidewall to the exterior of the conveyor where it will fall into a container or receptacle.

A provision is also made to remove any cans which may be carried along on the tops of the rows of cans. In this regard, a pair of deflectors are mounted above the level of an upright can at the rear end of the device and are curved outwardly toward the side edges of the conveyor. Any can which may be carried along on the top of a row of cans will engage the deflector and be deflected to the exterior of the conveyor.

The present invention serves a multiple purpose in that it not only separates an accumulation of cans or containers into two distinct rows, but also serves to right transversely oriented downed cans as well as removing longitudinally oriented downed cans from the conveyor.

The mechanism can be readily installed with any existing conveyor line and can be included anywhere in the conveyor system. The device has particular application for dividing the cans into rows prior to entering the packer, although in some cases the device can be utilized upstream of the pasteurizer or of inspection areas.

Other objects and advantages will appear in the course of the following description.

The drawings illustrate the best mode presently contemplated of carrying out the invention.

In the drawings:

FIG. 1 is a plan view of the mechanism of the invention and as associated with a conveyor system;

FIG. 2 is a side elevation of the structure shown in FIG. 1;

FIG. 3 is a section taken along line 3—3 of FIG. 1; and

FIG. 4 is a section taken along line 4—4 of FIG. 1, and showing a downed transverse can in phantom being righted by the inclined divider wall.

The drawings illustrate a mechanism 1 to be associated with a conveyor 2 for dividing an accumulation of cans or containers 3 into separate rows and for eliminating downed cans from the rows.

The conveyor 2 is a standard high-speed type and in itself forms no part of the invention. As shown in FIG. 3, the conveyor 2 includes an endless link belt 4 having its side edges supported on plastic wear strips 5 that are mounted on the upper edges of the sidewalls 6 of the conveyor. The cans 3 are guided in travel along the conveyor 2 by a pair of spaced guide rails 7.

The can-dividing mechanism 1 includes a frame 8 which is supported in spaced relation above the endless belt 4. Frame 8 includes a pair of channel-shaped sidewalls 9 and lugs 10 are welded to the lower flanges of sidewalls 9 and are connected to the upper flanges of brackets 11 by bolts 12. Brackets 11 are secured to the sidewalls 6 of the conveyor 2. With this construction, the sidewalls 9 are supported slightly above the level of the endless belt 4.

As shown in FIG. 4, a wear plate 13 formed of a plastic material having a low coefficient of friction, such as nylon, is applied to the sidewalls 9 by bolts 14 and the wear plates 13 aid in preventing jamming of the cans as they move through the mechanism.

In addition, to the sidewalls 9, the frame 8 includes a pair of sidewall extensions 15 which are connected to the sidewalls and are located at an obtuse angle with respect to the sidewalls 9. As in the case of the sidewalls 9, a plastic wear plate 16 is secured to the inner surface of the sidewall extensions 15 by bolts 17, as shown in FIG. 3.

To connect each sidewall 9 and the corresponding sidewall extension 15, a tie plate 18 is secured to the upper flanges of both the sidewall and the extension 15. As best illustrated in FIG. 2, the sidewalls 9 have a substantially greater height than the extensions 15, so that there is a gap or opening between the lower edge of the sidewall extensions 15 and the endless link belt 4 and the height of the openings is greater than the diameter of a can 3.

The frame 8 also includes a series of vertical angles 19 having their lower ends welded to the tie plates 18, and the upper ends of the angles 19 are connected together by cross angles 20. In addition, a pair of longitudinal angles 21 are connected between the cross angles 20.

A central wall assembly 22 is carried by the angles 20 and 21 and the wall assembly includes a divider wall 23 having its upper rear edge welded between the vertical flanges of the longitudinal angles 21. The forward inclined edge 24 of wall 23 is beveled and the forward tip or end 25 of wall 23 is tapered, as best shown in FIG. 1. The edge 24 is at an angle less than about 35° with respect to the horizontal.

The central wall assembly 22 also includes a pair of outwardly diverging inner wall sections 26 which are secured to the wall 23 and a pair of inwardly converging wall sections 27 which are interconnected between ends of the wall sections 26 and the plate 23. The wall sections 26 are provided with plastic wear plates 28, similar to the wear plates 13.

As best illustrated in FIG. 1, the central wall assembly 22 defines a pair of passages 29 with the sidewalls 9 and extensions 15. The upstream or inlet portions 29a of the passages are bordered by the forward end portion of the wall 23 and the sidewalls 9 and are generally parallel. Following downstream, the passages then diverge outwardly with the diverging portions 29b of the passages being bordered by the wall sections 26 and the sidewalls 9. Further downstream, the passages converge in the area 29c defined by the wall sections 27 and the sidewall extensions 15. Guide rails 30 and central rail 31 are located downstream of the extensions 15 and define parallel areas 29d of the passages.

In a normal operation the cans 3 are conveyed on the conveyor 2 in the direction of the arrows and when the cans reach the tip 25 of the wall 23, they will be separated into two distinct rows which move through the passages 29. As shown in FIG. 1, the spacing between the guide rails 7 is less than the spacing between the sidewalls 9. The cans approaching the central wall 22 are under pressure from the cans behind and when passing from the more restricted space between guide rails 7 to the space between sidewalls 9, the cans tend to jump outwardly, which aids in separating the cans into two rows in the passages 29. The rows of cans then pass through the outwardly diverging portions 29b of the passages, through the inwardly converging portions 29c of the passages, and back into parallel alignment at the downstream end of the device.

In the event a tipped transversely oriented can is in the line, the side of the downed can will engage the inclined edge 24 and as the can is moved along the conveyor, the can will ride up the incline as it moves from the portion 29a into diverging portion 29b of the passage. This action will tend to tilt the can to an upright position in the row, so that it can then be properly conveyed through the line. This is shown in FIG. 5.

In some rare instances, a transversely oriented downed can may strike the edge 24 precisely at its center which will cause the can to balance on the edge as it moves upwardly along the edge. In this situation, the can being balanced on the edge 24 may rotate on the edge above the level of the rows of cans in the passages 29 and will ultimately fall to either side on the top of the cans in the rows. The can will then be conveyed along the tops of the cans through the passage 29. To eliminate a can which may be carried along on the top of the cans in the row, a pair of deflector members 32 are secured to the rear edge of the plate 23 and are curved outwardly toward the edges of the conveyor. In the event that a can is carried along on the top of the row of cans, the can will strike the deflector 32 and will be deflected to the exterior of the conveyor.

In the event a downed can is being conveyed which is oriented in-line or longitudinally of the conveyor, the downed can will pass to one side or the other of the divider wall 23 and into the diverging portion 29b of the passage. The angularity of the diverging portion 29b and the converging portion 29c of the passage is correlated to the length of the can so that the can cannot pass from portion 29b to portion 29c and thus the downed can will be moved outwardly through the opening 33 beneath the sidewall extension 15 to the exterior of the conveyor as illustrated by the phantom lines in FIG. 1. Thus, any in-line downed can will be automatically ejected from the line and will not pass into the converging portion 29c of the passage.

The mechanism of the invention provides a multiple function in that it serves to divide an accumulation to cans into distinct rows without the possibility of jamming. In addition, the device serves to right downed cans which are oriented in a cross-direction and serves to remove cans from the line which are oriented in an in-line direction.

While the above description has been directed to the use of the device for a conveying system for a brewery, it is contemplated that the device can be utilized with any conveying system where it is desired to separate cans or other containers or packages into multiple rows.

Various modes of carrying out the invention are contemplated as being within the scope of the following claims particularly pointing out and distinctly claiming the subject matter which is regarded as the invention.

I claim:

1. In a conveyor system, a conveyor to convey a plurality of upright elongated articles, and guide means located above the conveyor and including a pair of side members and a central unit, each side member being spaced from the central unit and defining a passage therewith, each passage in a downstream direction including an outwardly diverging section followed by an inwardly diverging section, said articles moving on said conveyor and into said passages to thereby divide said plurality of articles into two rows, said central unit including an inclined member disposed to be engaged by a downed transversely oriented article and arranged to gradually right the downed article as the same passes along the conveyor, the portions of each sidewall bordering the converging section of each passage being provided with an opening, said opening being disposed in alignment with the diverging section of the respective passage, whereby a downed longitudinally oriented article passing through said diverging section of the passage will be automatically conveyed through said opening to the exterior of the conveyor.

2. The conveyor system of claim 1, wherein said diverging section and said converging section are located at an angle greater than 90° with respect to each other.

3. The conveyor system of claim 1, and including support means for supporting the guide means in spaced relation above the conveyor.

4. The conveyor system of claim 1, and including deflector means located downstream of the said inclined member and positioned above the level of the upright articles being conveyed for deflecting an article carried on the tops of the upright articles laterally to the exterior of the conveyor.

5. The conveyor system of claim 1, wherein said deflector means includes a generally curved deflector member located at the downstream end of the central unit.

6. The conveyor system of claim 1, wherein said inclined member has a beveled edge inclined upwardly in a downstream direction.

7. The conveyor system of claim 1, wherein said central unit includes a pair of wall sections each wall section being disposed generally parallel to a side member to provide said passage therebetween, said inclined member being disposed between said wall sections and extending upwardly beyond the upper edges of said wall sections.

8. The conveyor system of claim 1, and including a pair of spaced guide members located above the conveyor and disposed immediately upstream of said guide means, the lateral spacing between said guide members being less than the lateral spacing between the side members of said guide means whereby the articles moving from the space between said guide members into said passages will be forced laterally outward by the pressure of the articles upstream.

9. In a conveyor system, a conveyor to convey a plurality of upright elongated articles, and guide means located above the conveyor and including a pair of guide members defining a passage to receive a row of said articles, said passage including a first upstream section and a second downstream section, said sections being located at an obtuse angle with respect to each other, a portion of one of the guide members bordering the downstream section of the passage having an opening of a size to accommodate a downed article, said opening being disposed in alignment with the upstream section of said passage whereby an in-line downed article passing through said upstream section will be conveyed through said opening to the exterior of the conveyor.

10. The conveyor system of claim 9, wherein said articles are cans and said opening has a size to accommodate an end of the can.

11. In a conveyor system, a conveyor to convey a plurality of upright elongated articles, guide means located above the conveyor and including a pair of side members and a central unit, each side being spaced from the central unit and defining a passage therewith, each passage in a downstream direction including an outwardly diverging section followed by an inwardly converging section, said articles moving on said conveyor and into said passages to thereby divide said plurality of articles into two rows, said central unit including an inclined member having an edge inclined upwardly in a downstream direction and a pair of wall sections located on either side of the inclined member, each wall section being disposed generally parallel to a side member to provide said passages therebetween, said inclined edge disposed to be engaged by a downed transversely oriented article and arranged to gradually right the downed article as the same passes along the conveyor, the portions of each sidewall bordering the converging section of each passage being provided with an opening, said opening being disposed in alignment with the diverging section of the respective passage, whereby a downed longitudinally oriented article passing through said diverging section of said passage will be automatically conveyed through said opening to the exterior of the conveyor, and a pair of spaced guide members located above the conveyor and disposed immediately upstream of said guide means, the lateral spacing between said guide members being less than the lateral spacing between the side members of said guide means whereby the articles moving from the space between said guide members into said passage will be forced laterally outward by the pressure of the articles upstream.

* * * * *

UNITED STATES PATENT OFFICE
CERTIFICATE OF CORRECTION

Patent No. 3,643,782          Dated February 22, 1972

Inventor(s)  ROBERT F. RISLEY

It is certified that error appears in the above-identified patent and that said Letters Patent are hereby corrected as shown below:

Column 1, line 46, Delete "conveying" and substitute therefor -- covering --.    Column 4, line 65, After "side" insert ---member---.

Signed and sealed this 12th day of September 1972.

(SEAL)
Attest:

EDWARD M. FLETCHER, JR.
Attesting Officer

ROBERT GOTTSCHALK
Commissioner of Patents

UNITED STATES PATENT OFFICE
CERTIFICATE OF CORRECTION

Patent No. 3,643,782      Dated February 22, 1972

Inventor(s)   Robert F. Risley

It is certified that error appears in the above-identified patent and that said Letters Patent are hereby corrected as shown below:

Column 1, line 46, cancel "conveying" and substitute -- converging --. Column 4, line 65, after "side" insert -- member --.

This certificate supersedes Certificate of Correction issued September 12, 1972.

Signed and sealed this 20th day of August 1974.

(SEAL)
Attest:

McCOY M. GIBSON, JR.
Attesting Officer

C. MARSHALL DANN
Commissioner of Patents